(12) United States Patent
Chandra et al.

(10) Patent No.: US 10,554,368 B2
(45) Date of Patent: Feb. 4, 2020

(54) WIRELESS DATA-ACKNOWLEDGEMENT COMMUNICATION USING FRAME AGGREGATION

(71) Applicant: Microsoft Technology Licensing, LLC, Redmond, WA (US)

(72) Inventors: Ranveer Chandra, Kirkland, WA (US); David W. Russo, Woodinville, WA (US); Hang Yu, Houston, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 260 days.

(21) Appl. No.: 14/877,078

(22) Filed: Oct. 7, 2015

(65) Prior Publication Data

US 2017/0104569 A1 Apr. 13, 2017

(51) Int. Cl.
*H04L 5/00* (2006.01)
*H04W 72/04* (2009.01)

(52) U.S. Cl.
CPC ....... *H04L 5/0055* (2013.01); *H04W 72/0446* (2013.01)

(58) Field of Classification Search
CPC ... H04L 1/16; H04L 1/18; H04L 5/00; H04W 72/04; H04W 80/02
See application file for complete search history.

(56) References Cited

U.S. PATENT DOCUMENTS

| | | | |
|---|---|---|---|
| 8,045,574 B2 | 10/2011 | Sherman et al. | |
| 8,059,607 B1 | 11/2011 | Shaw et al. | |
| 8,072,910 B2 | 12/2011 | Thubert et al. | |
| 8,194,626 B2 | 6/2012 | Moorti et al. | |
| 8,385,272 B2 | 2/2013 | Gaur | |
| 8,677,195 B2 | 3/2014 | Kim et al. | |

(Continued)

FOREIGN PATENT DOCUMENTS

EP 2104245 A1 9/2009

OTHER PUBLICATIONS

International Search Report and Written Opinion for PCT Application No. PCT/US2016/053857, dated Nov. 25, 2016, 14 pages.

(Continued)

*Primary Examiner* — Jeffrey M Rutkowski
*Assistant Examiner* — Andre Tacdiran
(74) *Attorney, Agent, or Firm* — Ray Quinney & Nebeker P.C; James Bullough

(57) ABSTRACT

The disclosed subject matter includes techniques for wireless communication. In one example, a system includes a processor and a computer-readable memory storage device for storing executable instructions that can be executed by the processor to cause the processor to send a data frame to a client device. The processor can also receive a data-acknowledgment frame from the client device in response to the data frame within a predetermined time after sending the data frame. The processor can also aggregate a response data-acknowledgment frame in response to receiving the data-acknowledgment frame with at least one data frame to form an aggregated frame. The processor can also further send the aggregated frame to the client device and the at least one other client device within the predetermined time after receiving the data-acknowledgement frame.

22 Claims, 6 Drawing Sheets

(56) References Cited

U.S. PATENT DOCUMENTS

| | | | |
|---|---|---|---|
| 8,718,089 B2 | 5/2014 | Famolari | |
| 8,837,478 B1 | 9/2014 | Nemavat et al. | |
| 8,855,088 B2 | 10/2014 | Cordeiro | |
| 2005/0041688 A1* | 2/2005 | Bernhard | H04L 29/06 370/473 |
| 2005/0163155 A1* | 7/2005 | Yang | H04L 1/0006 370/465 |
| 2005/0249183 A1* | 11/2005 | Danon | H04B 7/2628 370/347 |
| 2006/0107166 A1* | 5/2006 | Nanda | H04B 7/0417 714/748 |
| 2007/0165590 A1 | 7/2007 | Kneckt et al. | |
| 2007/0206508 A1* | 9/2007 | Sammour | H04W 28/06 370/252 |
| 2009/0147719 A1* | 6/2009 | Kang | H04L 12/189 370/312 |
| 2010/0128680 A1* | 5/2010 | Coletti | H04L 47/14 370/329 |
| 2010/0302960 A1* | 12/2010 | Bjorken | H04L 1/0003 370/252 |
| 2011/0019557 A1 | 1/2011 | Hassan et al. | |
| 2012/0177015 A1* | 7/2012 | Nabar | H04B 7/2618 370/337 |
| 2012/0239998 A1* | 9/2012 | Park | H04L 1/1812 714/748 |
| 2013/0294427 A1* | 11/2013 | Kim | H04W 16/14 370/338 |
| 2013/0301569 A1 | 11/2013 | Wang et al. | |
| 2014/0071956 A1 | 3/2014 | Park et al. | |
| 2014/0280650 A1* | 9/2014 | VanderZee | H04L 51/30 709/206 |
| 2014/0349745 A1 | 11/2014 | Russo et al. | |
| 2014/0372585 A1* | 12/2014 | Hui | H04L 49/20 709/223 |
| 2015/0295841 A1* | 10/2015 | Neelisetty | H04L 47/56 370/328 |
| 2015/0358995 A1* | 12/2015 | Li | H04L 5/0007 370/329 |
| 2016/0014804 A1* | 1/2016 | Merlin | H04L 5/0044 370/329 |
| 2016/0028452 A1* | 1/2016 | Chu | H04J 11/00 375/267 |
| 2016/0066208 A1* | 3/2016 | Baron | H04W 74/085 370/230 |
| 2016/0212748 A1* | 7/2016 | Yang | H04L 5/0055 |
| 2016/0219591 A1* | 7/2016 | Lee | H04W 40/244 |
| 2016/0278081 A1* | 9/2016 | Chun | H04L 5/0007 |
| 2016/0323881 A1* | 11/2016 | Bhora | H04L 1/1854 |
| 2017/0127451 A1* | 5/2017 | Chun | H04W 84/12 |

OTHER PUBLICATIONS

Ahuja, Sanjay P., "IEEE 802.11—Wi-Fi", Retrieved on: Mar. 13, 2015 Available at: https://www.google.co.in/url?sa=t&rct=j&q=&esrc=s&source=web&cd=1&cad=rja&uact=8&ved=0CB0QFjAA&url=http%3A%2F%2Fwww.unf.edu%2F~sahuja%2Fcnt5505%2FIEEE802.11.ppt&ei=ecsCVeG6GoOTuQSZ-YLACw&usg=AFQjCNEZzVhc8Xs3JNqFtdCcCVdQ-9TynA&bvm=bv.88198703,d.c2E.

Kim, et al., "Downlink and Uplink Resource Allocation in IEEE 802.11 Wireless LANs", In Proceedings of IEEE Transactions on Vehicular Technology, vol. 54, Issue 1, Jan. 2005, pp. 320-327.

"Second Written Opinion Issued in PCT Application No. PCT/US2016/053857", dated Aug. 8, 2017, 7 Pages.

"International Preliminary Report on Patentability Issued in PCT Application No. PCT/US2016/053857", dated Nov. 30, 2017, 8 Pages.

"Office Action Issued in European Patent Application No. 16779268.8", dated Jan. 30, 2019, 8 Pages.

* cited by examiner

100

WIRELESS DATA-ACKNOWLEDGEMENT COMMUNICATION USING FRAME AGGREGATION

BACKGROUND

Client devices and access points in a wireless network typically take turns contending for access to time on a shared network under the principle of packet fairness. For example, a client device and an access point may have equal opportunity for sending a frame. After a device successfully contends for the network, the device can then send a packet to a destination. Other devices wait until the device is finished sending packets to contend for the network again. The device that subsequently successfully contends can then send the next packet using the network.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

An implementation provides for a system for wireless communication. The system can include a processor and a computer-readable memory storage device storing executable instructions that, based at least on an execution by the processor, can cause the processor to send a data frame to a client device. The system can also include instructions to cause the processor to receive a data-acknowledgment frame from the client device in response to the data frame within a predetermined time. The system can also include instructions to cause the processor to aggregate a response data-acknowledgment frame with at least one data frame to form an aggregated frame. The system can also include instructions to cause the processor to send the aggregated frame to the client device and the at least one other client device within the predetermined time after receiving the data-acknowledgement frame.

Another implementation provides a system for wireless communication. The system can include a processor and a computer-readable memory storage device storing executable instructions that, based at least on an execution by the processor, can cause the processor to receive a first data frame from a host device. The system can also include instructions to cause the processor to generate a data-acknowledgment frame and send the data-acknowledgement frame to the host device in response to receiving the first data frame. The system can further include instructions to cause the processor to receive an aggregated frame including a response data-acknowledgement frame from the host device. The system can also further include instructions to cause the processor to receive a second aggregated frame including a second data frame from the host device. The system can also further include instructions to cause the processor to generate a second data-acknowledgment frame and send the second data-acknowledgment frame to the host device in response to receiving the second aggregated frame.

Another implementation provides for a method for wireless communication. The method can include sending, via a host device, a data frame to a client device. The method can further include receiving, at the host device, a data-acknowledgment frame from the client device in response to the data frame within a predetermined time. The method can also further include aggregating, via the host device, a response data-acknowledgment frame with at least one data frame to be sent to at least one other client device. The method can include sending, via the host device, the aggregated frame to the client device and the at least one other client device within the predetermined time after receiving the data-acknowledgement frame.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

As described above, packet fairness techniques can give each device on the network an opportunity to transmit data over a network in a first come-first served manner. However, collisions may occur when two or more devices attempt to access the network, or contend for transmitting data, at the same time. Thus, transmitting data using packet fairness techniques can result in contention that can increase the latency for client devices and access point. Moreover, in a centralized network, an access point or host device may have many more data frames to send than the client devices of the network. In some cases, contention can also cause increased latency of packets, resulting in poor performance. For example, performance can be particularly affected in real-time and gaming scenarios.

This disclosure describes techniques for wireless communication. In particular, a host device including an access point and one or more client devices can communicate via a series of data-acknowledgment frames. As used herein, a data-acknowledgment, or DACK, frame refers to a data frame that is sent as an acknowledgment frame within a predetermined amount of time in response to receiving a frame. For example, the predetermined amount of time can be a Short Interframe Space (SIFS) time. In some examples, the access point can aggregate a DACK frame to be sent to one client with a data frame to be sent to another client. Aggregation, as used herein, refers to sending two or more data frames in a single transmission. For example, aggregation can include MAC Service Data Unit (MSDU) aggregation and MAC Protocol Data Unit (MPDU) aggregation. In some embodiments, an access point can include a DACK timeout timer that can be set based on DACK length. In some embodiments, the access point can schedule DACK frames based on an expiration time of one or more queued data frames.

The techniques described herein thus enable a wireless network with reduced overall contention between network devices. For example, the techniques allow the devices to avoid the contention associated with using acknowledgements in response to each transmitted data frame. In addition, the techniques herein further reduce the number of times that an access point contends for a transmission of data. For example, the access point can send two or more data frames to different client devices as a single aggregated DACK frame. These techniques are described in more detail herein.

Figure 5:
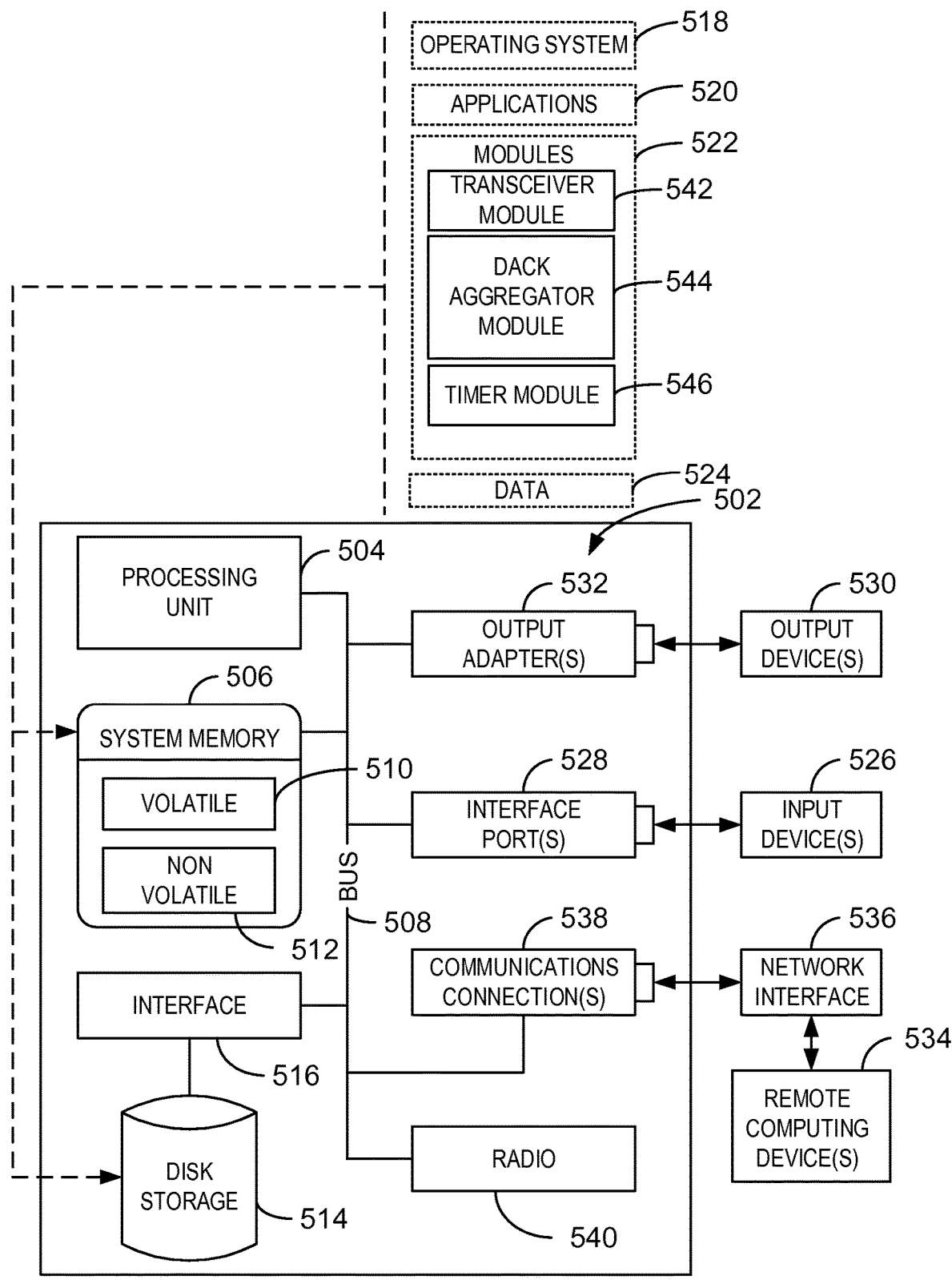
FIG. 5 is a block diagram of an example system for wireless communication.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 5, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. For example, the phrase "configured to" can refer to a structure of an associated hardware elements to implement the associated functionality. The phrase "configured to" can also refer to the coding design of associated coding elements such as modules to implement the associated function of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts of FIGS. 3-4 below corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals.

Figure 1:
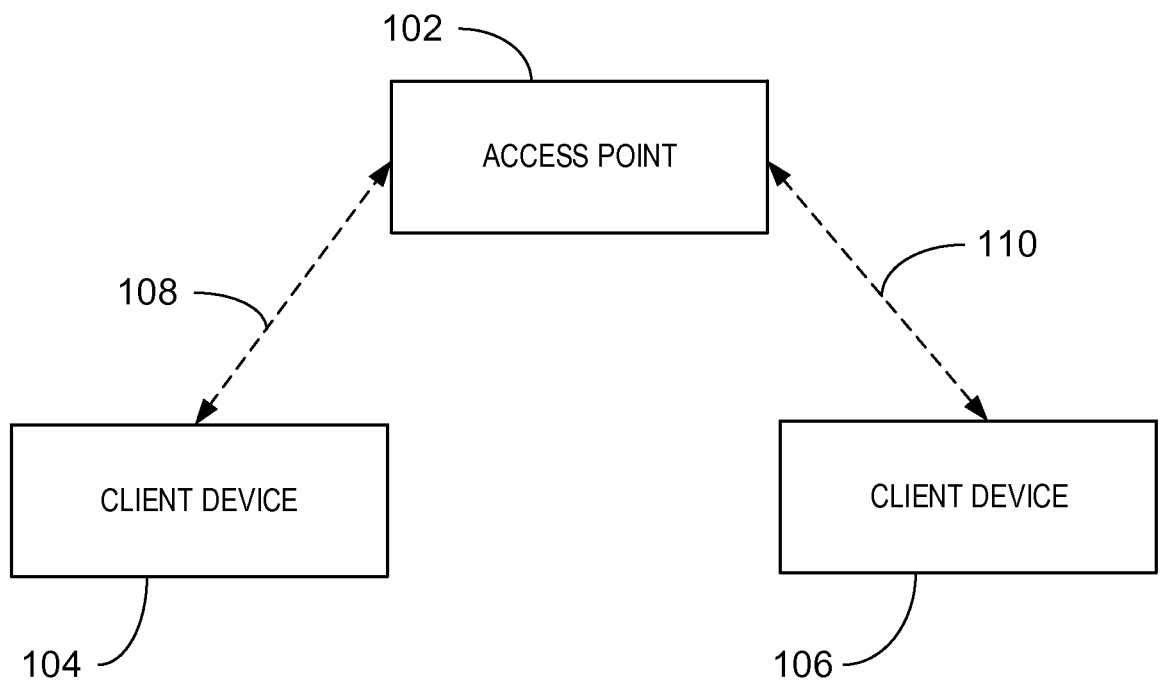
FIG. 1 is a block diagram of an example operating environment configured for implementing various aspects of the techniques described herein.

FIG. 1 is a block diagram of an example operating environment configured for implementing various aspects of the techniques described herein. The example operating environment of FIG. 1 is referred to generally by the reference number 100.

The example operating environment 100 includes a host device 102, a client device 104, and a client device 106. The client device 104 is coupled to the access point 102 via a wireless local area network connection 108. The client device 106 is coupled to the access point 102 via a wireless local area network connection 110.

In the example operating environment 100, the access point 102 may have received a data frame from the client device 104 and may have a data frame queued to be sent to the client device 106. In some examples, the data frame from the client device 104 may be a data-acknowledgement (DACK) frame. The DACK frame may have been sent within a predetermined amount of time of receiving a data frame from the access point 102. For example, the predetermined time can be a SIFS time. In embodiments, in order to reduce contention and associated collisions, the access point can aggregate the data frame to be send to the client device 106 with a data frame to be sent to the client device 104 as an aggregated DACK frame. Thus, the client 104 and the client 106 can each receive the aggregated DACK frame.

In some examples, the client receiving a data frame can respond to the aggregated DACK frame with a DACK and thus without contending for transmission of a data frame. Thus, a series of DACKS can be used to communicate without contending as described in more detail with respect to FIG. 2 below. In some examples, a limit can be preset to the number of consecutive S-DACKs. For example, the limit can be based on a number of factors. For example, the limit can be based on the amount of data latency to be tolerated, the number of clients within the network, and/or the priority of the packet traffic.

The diagram of FIG. 1 is not intended to indicate that the example operating environment 100 is to include all of the components shown in FIG. 1. Rather, the example operating environment 100 can include fewer or additional components not illustrated in FIG. 1 (e.g., additional access points, client devices, etc.).

Figure 2:
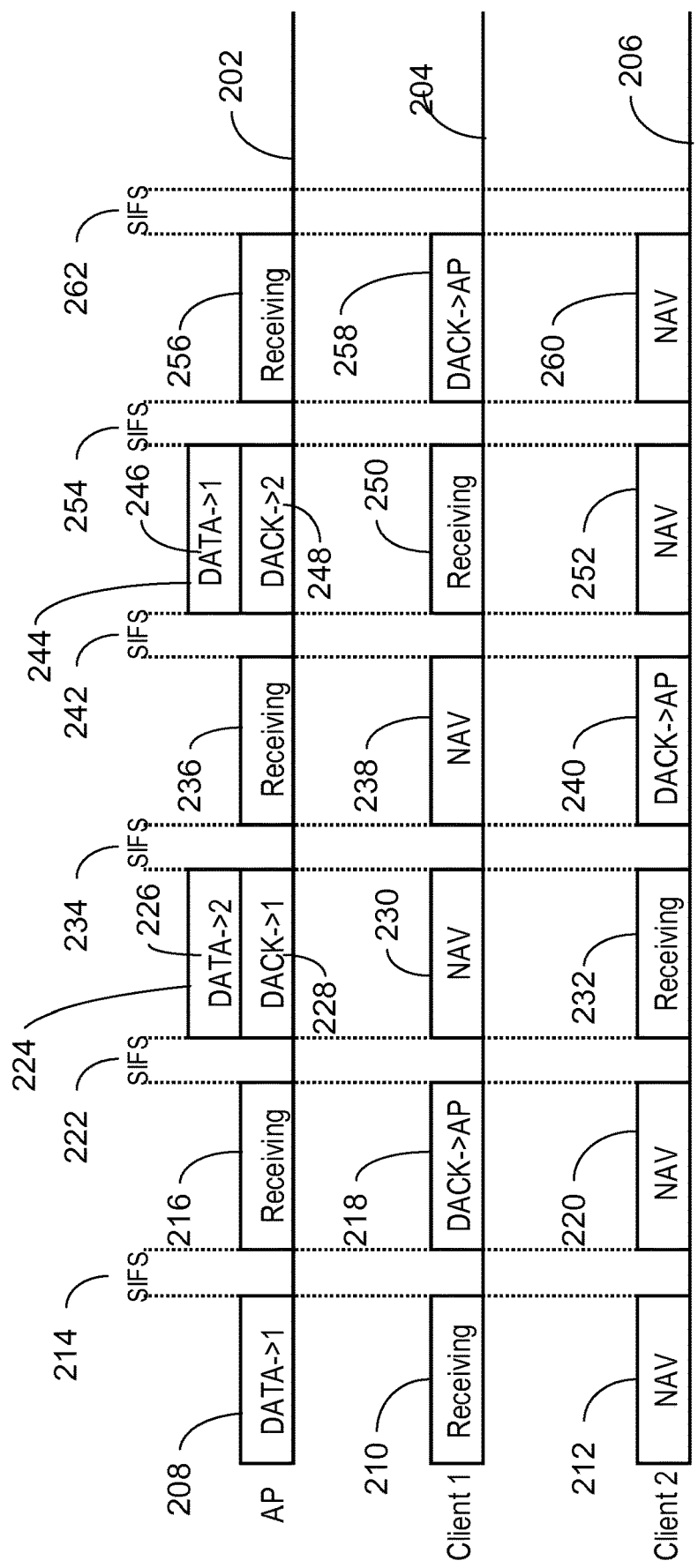
FIG. 2 is a timing diagram of an example operating environment configured for implementing various aspects of the techniques described herein.

FIG. 2 is a timing diagram of an example operating environment configured for implementing various aspects of the techniques described herein. The example operating environment of FIG. 2 is referred to generally by the reference number 200.

The example operating environment 200 includes three time lines 202, 204, and 206, wherein time line 202 represents an access point, timeline 204 represents a first client, and timeline 206 represents a second client. The access point timeline 202 begins at block 208. At block 208, the access point sends a data frame to the first client. For example, the access point may have contended for access to transmit a data frame and requested access to the network before the first client and the second client. At block 210, the first client receives the data frame from the access point. At block 212, the second client has been temporarily blocked from transmitting data. For example, the second client can read a duration field in the data frame sent from the access point and set a network allocation vector (NAV). As used herein, the NAV refers to a virtual carrier-sensing mechanism that can be used as a counter by a client to defer transmission access to a medium.

Still referring to FIG. 2, a first SIFS period is indicated at time 214. The SIFS period may be a time that the first client can respond to the data frame from the access point without contending for the medium. For example, the second client and the access point do not contend for access to the medium during the first SIFS period 214. At block 216, the access point receives a DACK from the first client. As discussed above, the DACK refers to a data frame transmitted as an acknowledgement frame. At block 218, the first client sends a DACK to the access point. At block 220, the second client detects the duration field in the DACK frame sent by the first client and sets its NAV accordingly. A second SIFS time 222 follows the sending of the DACK from the first client to the access point.

In some examples, the DACK frames can be enabled using two reserved fields in the 802.11 MAC header. For example, one field can be the 6-byte "Address 4" field of the 802.11 MAC header. The Address 4 field can be used to indicate the address of the device that is waiting to be acknowledged. In some examples, the "rsvd" field of the 802.11 MAC header may also be used. For example, the 1-bit "rsvd" field can be set to the value of "1" if the frame is a DACK, thus indicating that DACK is enabled. Otherwise, the "rsvd" field can be set to a value of "0". A device sending a DACK can set these two fields. A device waiting for an ACK can check these two fields for any received frames, including frames not destined to the device.

Within the second SIFS time 222, at block 224, the access point is shown sending an aggregate frame including a data frame 226 for the second client and a DACK frame 228 for the first client. At block 230, the first client detects the duration period in the aggregate DACK 224 and sets its NAV accordingly. For example, the duration period can be included in the aggregate DACK header. In some examples, the duration period can be set by the DACK timeout timer of the access point. The duration period can be set for a period of time that the access point will reserve for transactions. For example, the longer the duration period, the longer other client traffic is restricted from being sent using the network. Although the first client cannot transmit data during the NAV period, the first client can receive the DACK frame 228 from the access point. At block 232, the second client receives the aggregate frame 224 including the data frame 226. Thus, the access point can send out an aggregate frame to two clients at the same time. Moreover, the access point does not contend to transmit the aggregated frame because the access point responds within the second SIFS time 222 in response to the DACK frame 218 from the first client.

Within the following third SIFS time 234, at block 236 the access point receives a DACK from the second client. At block 238, the first client detects a duration time in the DACK from the second client and sets its NAV period accordingly. At block 240, the second client sends the DACK to the access point.

Within the following fourth SIFS time 242, at block 244, the access point sends a second aggregate frame 244 including a data frame 246 for the first client and a DACK frame 248 for the second client. At block 250, the first client receives the data frame 246. At block 252, the second client sets its NAV period according to the duration field in the aggregate packet 244. The second client can also receive the DACK frame 248 in response to the DACK frame 240 sent to the access point. A third SIFS period 254 follows the transmission of the aggregate DACK frame 244.

Within the fifth SIFS period 254, at block 256, the access point receives a DACK frame from the first client in response to the aggregate frame 244. At block 258, the first client sends the DACK frame to the access point. At block 260, the second client detects a duration period from the DACK frame sent by the first client, and sets its NAV period accordingly. Another SIFS period 262 follows the receipt of the DACK frame by the access point.

Thus, with only one successful contention at block 208, a total of five DACKS and three data frames, including two aggregate DACKs, are sent and received in FIG. 2. In some examples, the series of DACKs, or S-DACKS, can continue for a predetermined time or until a predetermined amount of data has been sent from the access point. The S-DACKS can be used by the access point to improve downlink fairness. For example, if the reception with the client devices exceeds a threshold wireless metric, then the access point can use S-DACKS to increase the amount of data frames the access point can send to the clients. In some examples, the wireless metric can be a signal-to-interference-plus-noise ratio (SINR). Moreover, given enough consecutive S-DACKs, the "two-way" handshake mechanism of contention becomes a "one-way" mechanism, wherein the access point and the clients can send data frames with little, if any, overhead.

For example, assuming N clients and one access point (AP), a ratio can be defined between an uplink and a downlink throughput as $\beta$. In typical 802.11 operation, since the AP and each client have equal chances to win contention, the value of the throughput ratio $\beta$ can be $\beta=N$. Using a single DACK, each client has one "free" data transmission when the AP sends a downlink data frame. The AP similarly has one "free" data transmission when a client sends an uplink data frame. Therefore, the normalized downlink throughput can be determined by the equation: $1/M+(M-1)/M=1$; the normalized uplink throughput can be: $1/M+2(M-1)/M=2-1/M$. As a result, $\beta=2-1/M$, which indicates that the throughput ratio of the access point has increased.

With S-DACK, uplink and downlink throughput can be equal. Thus, in the case of S-DACK, R=1. Thus, S-DACK enables networks congested by multiple clients with heavy traffic, or with heavy interference, to resolve a downlink-uplink problem wherein uplink throughput greatly outweighs downlink throughput using the typical contention mechanism.

The diagram of FIG. 2 is not intended to indicate that the example operating environment 200 is to include all of the components shown in FIG. 2. Rather, the example operating environment 200 can include fewer or additional components not illustrated in FIG. 2 (e.g., additional controllers, target devices, host devices, etc.).

Figure 3:
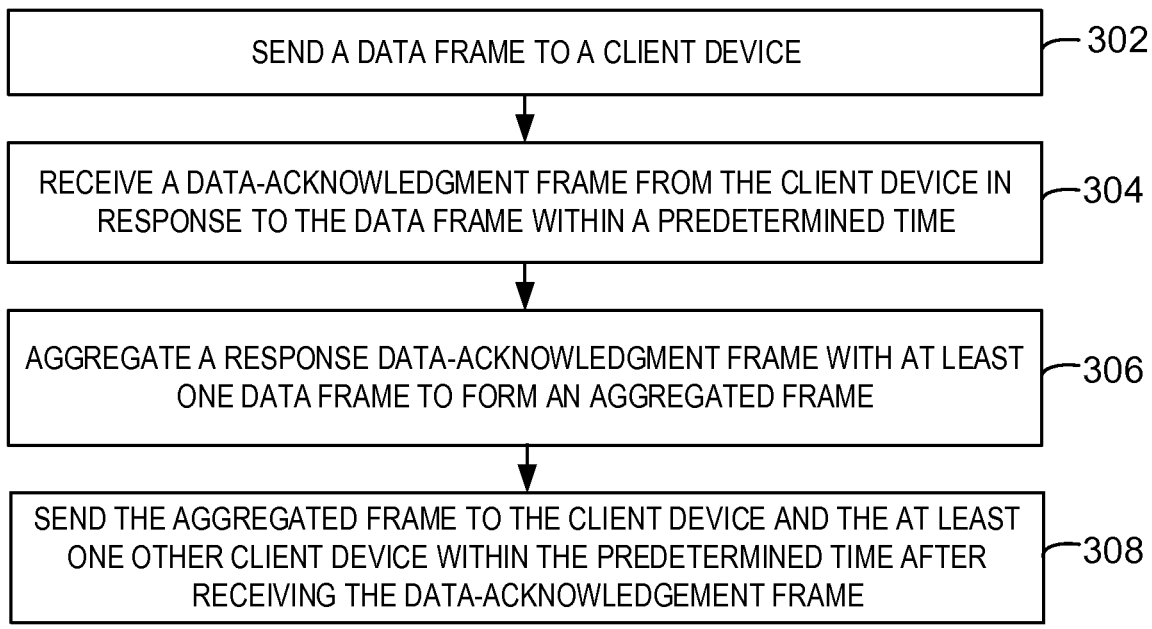
FIG. 3 is a process flow diagram of an example method for wireless communication.

FIG. 3 shows a process flow diagram of an example method for wireless communication. The example method is generally referred to by the reference number 300 and can be implemented using computer 502 as described below in relation to FIG. 5. The example method 300 can also be performed by the access point 102 of FIG. 1 above.

At block 302, the access point sends a data frame to a client device. For example, the data frame can correspond to any file or portion of a file to be sent to the client device. In some embodiments, the access point can send a data frame to a client device using any suitable wireless protocol. In some examples, the access point may have sent a beacon to the client device. For example, the beacon can include a field set to a value indicating data-acknowledgment is enabled. A direct exchange during service discovery can be used to enable S-DACK during service discovery.

At block 304, the access point receives a data-acknowledgment (DACK) frame from the client device within a predetermined time. For example, the predetermined time can be a SIFS time. In some examples, the SIFS time delay can vary based upon the protocol used to transmit data. Furthermore, as discussed above, the data-acknowledgement frame can include any suitable amount of data to be transmitted in an acknowledgment frame. In some examples, the access point can detect that S-DACK can be used in response to receiving a DACK frame from the client device.

At block 306, the access point aggregates a response data-acknowledgment (DACK) frame with at least one data frame to form an aggregated frame. In some embodiments, the DACK frame is aggregated in response to receiving a data-acknowledgment frame. For example, a DACK frame can be aggregated using MSDU or MPDU aggregation techniques. In some examples, the access point can aggregate a DACK in response to detecting a signal strength at the receiving client device that exceeds a threshold signal strength. For example, the signal strength can be measured using a wireless metric such as a signal-to-interference-plus-noise ratio (SINR).

At block 308, the access point sends the aggregated frame to the client device and the at least one other client device within the predetermined time after receiving the data-acknowledgement frame. For example, the predetermined time can be a SIFS period as discussed with respect to FIG. 2 above. In some examples, the aggregated frame can be sent to the client based on detecting a signal strength that exceeds a threshold signal strength. For example, the signal strength can be measured using SINR. In some examples, the access point can receive a second data-acknowledgement frame from the at least one other client device within the predetermined amount of time after sending the aggregated frame. For example, the second DACK frame can be in response to the aggregated frame. In some examples, the access point can schedule a plurality of data frames to be sent to the client device based on expiration times for the plurality of data frames. For example, a plurality of frames with different expiration times may be in queue at the access point. In some examples, the access point can also send a wakeup time to the client device. For example, the wakeup time can be in the aggregate frame header and can be used by the client to set a NAV period.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application.

Figure 4:
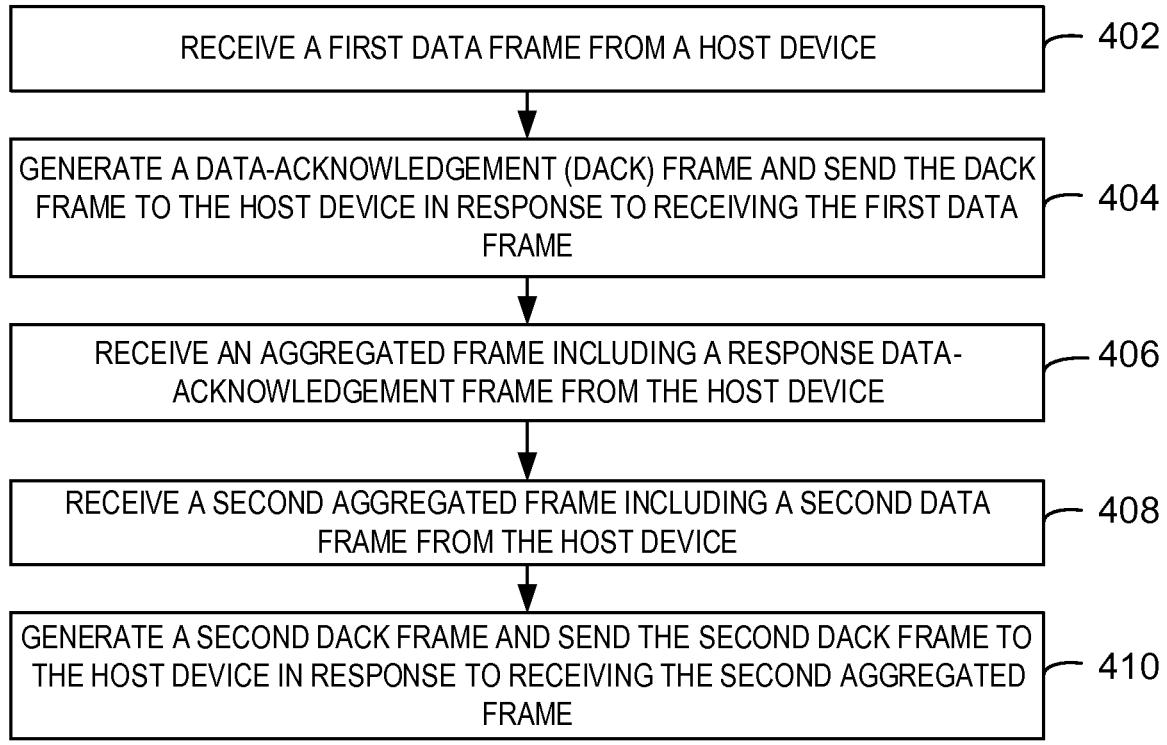
FIG. 4 is a process flow diagram of another example method for wireless communication.

FIG. 4 shows a process flow diagram of an example method for wireless communication. The example method is generally referred to by the reference number 400 and can be implemented using computer 502 as described below in relation to FIG. 5. The example method 400 can also be performed by either of the client devices of FIG. 1 above.

At block 402, the client device receives a first data frame from a host device. The data frame can include any amount of data corresponding to an application, hardware operation, and the like. In some embodiments, the size of the data frame can be predetermined in accordance with a wireless protocol. Furthermore, in some examples, the host device can include an access point. In some examples, the host device can be a gaming console and the client device can be a wireless controller.

At block 404, the client device generates a data-acknowledgement (DACK) frame and sends the DACK frame to the host device in response to receiving the first data frame. For example, the DACK frame can be sent to the host device within a predetermined time, such as a SIFS time.

At block 406, the client device receives an aggregated frame including a response data-acknowledgement frame from the host device. For example, the aggregated frame can include a DACK frame in response to the DACK frame sent at block 404. In some examples, the aggregated frame can also include a data frame to be sent to another client device.

At block 408, the client device receives a second aggregated frame including a second data frame from the host device. For example, the second aggregated frame can include one or more data frames to be sent to the client device in addition to a DACK frame for another client device.

At block 410, the client device generates a second data-acknowledgment (DACK) frame sends the second DACK frame to the host device in response to receiving the second aggregated frame. For example, the second DACK frame can be sent within a predetermined amount of time of receiving the second aggregated frame, such as a SIFS period.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application.

FIG. 5 is a block diagram of an example system for wireless control. The example system 500 includes a computing device 502. The computing device 502 includes a processing unit 504, a system memory 506, and a system bus 508. For example, the computing device 502 may be the host device 102 or the client device 104 of FIG. 1 above. In some examples, the computing device 502 can be a gaming console, a personal computer (PC), an accessory console, a gaming controller, among other computing devices. In some examples, the computing device 502 can be a node in a cloud network.

The system bus 508 couples system components including, but not limited to, the system memory 506 to the processing unit 504. The processing unit 504 can be any of various available processors. Dual microprocessors and other multiprocessor architectures also can be employed as the processing unit 504.

The system bus 508 can be any of several types of bus structure, including the memory bus or memory controller, a peripheral bus or external bus, and a local bus using any variety of available bus architectures known to those of ordinary skill in the art. The system memory 506 includes computer-readable storage media that includes volatile memory 510 and nonvolatile memory 512.

The basic input/output system (BIOS), containing the basic routines to transfer information between elements within the computer 502, such as during start-up, is stored in nonvolatile memory 512. By way of illustration, and not limitation, nonvolatile memory 512 can include read-only memory (ROM), programmable ROM (PROM), electrically programmable ROM (EPROM), electrically erasable programmable ROM (EEPROM), or flash memory.

Volatile memory 510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 502 also includes other computer-readable media, such as removable/non-removable, volatile/nonvolatile computer storage media. FIG. 5 shows, for example a disk storage 514. Disk storage 514 includes, but is not limited to, devices like a magnetic disk drive, floppy disk drive, tape drive, Jaz drive, Zip drive, LS-210 drive, flash memory card, or memory stick.

In addition, disk storage 514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used such as interface 516.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer 502.

System applications 520 take advantage of the management of resources by operating system 518 through program modules 522 and program data 524 stored either in system memory 506 or on disk storage 514. It is to be appreciated that the disclosed subject matter can be implemented with various operating systems or combinations of operating systems.

A user enters commands or information into the computer 502 through input devices 526. Input devices 526 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. In some examples, the client device of FIG. 1 may be an input device 526 of a host device including an access point. The input devices 526 connect to the processing unit 504 through the system bus 505 via interface ports 528. Interface ports 528 include, for example, a serial port, a parallel port, a game port, and a universal serial bus (USB).

Output devices 530 use some of the same type of ports as input devices 526. Thus, for example, a USB port may be used to provide input to the computer 502, and to output information from computer 502 to an output device 530.

Output adapter 532 is provided to illustrate that there are some output devices 530 like monitors, speakers, and printers, among other output devices 530, which are accessible via adapters. The output adapters 532 include, by way of illustration and not limitation, video and sound cards that provide a means of connection between the output device 530 and the system bus 508. It can be noted that other devices and systems of devices provide both input and output capabilities such as remote computing devices 534.

The computer 502 can be a server hosting various software applications in a networked environment using logical connections to one or more remote computers, such as remote computing devices 534. The remote computing devices 534 may be client systems configured with web browsers, PC applications, mobile phone applications, and the like. The remote computing devices 534 can be a personal computer, a server, a router, a network PC, a workstation, a microprocessor based appliance, a mobile phone, a peer device or other common network node and the like, and typically includes many or all of the elements described relative to the computer 502.

Remote computing devices 534 can be logically connected to the computer 502 through a network interface 536 and then connected via a communication connection 538, which may be wireless. Network interface 536 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 538 refers to the hardware/software employed to connect the network interface 536 to the bus 508. While communication connection 538 is shown for illustrative clarity inside computer 502, it can also be external to the computer 502. The hardware/software for connection to the network interface 536 may include, for exemplary purposes, internal and external technologies such as, mobile phone switches, modems including regular telephone grade modems, cable modems and DSL modems, ISDN adapters, and Ethernet cards.

The computer 502 can further include a radio 540. For example, the radio 540 can be a wireless local area network radio that may operate one or more wireless bands. In some examples, the radio 540 can operate on any suitable band and include any number of antennas.

An example processing unit 504 for the server may be a computing cluster. Additionally, the disk storage 514 can store various types of data 524 used for wireless communication. For example, the disk storage 514 may be an enterprise data storage system. In some examples, the disk storage 514 may store data 524 such as network packets.

The computer 502 includes one or more modules 522 configured to enable wireless communication using aggregated DACKs, including a transceiver module 542, a DACK aggregator module 544, and a timer module 546. The transceiver module 542, DACK aggregator module 544, and timer module 546, refer to structural elements that perform associated functions. In some embodiments, the functionalities of the transceiver module 542, DACK aggregator module 544, and timer module 546, can be implemented with logic, wherein the logic, as referred to herein, can include any suitable hardware (e.g., a processor, among others), software (e.g., an application, among others), firmware, or any combination of hardware, software, and firmware. The transceiver module 542 can send a data frame to a client device. The transceiver module 542 can receive a data-acknowledgment frame from the client device in response to the data frame within a predetermined time after sending the data frame. For example, the predetermined can be a Short Interframe Space (SIFS) time. In some examples, the data-acknowledgment frame can include an address field including a media access control (MAC) address of an access point including the processor and a resolved field set to a value indicating enabled data-acknowledgment. The DACK aggregator module 544 can aggregate a response data-acknowledgment frame in response to receiving the data-acknowledgment frame with at least one data frame to be sent to at least one other client device. In some examples, the DACK aggregator module 544 can aggregate the DACK in response to detecting a signal strength that exceeds a threshold signal strength. For example, the threshold signal strength may be a predetermined SINR value. In some examples, the response data acknowledgement frame can include an address field including a MAC address of the client device and a resolved field set to a value indicating enabled data-acknowledgment. The transceiver module 544 can further send the aggregated frame to the client device and the at least one other client device within the predetermined time after receiving the data-acknowledgement frame.

In some examples, the transceiver module 542 can further receive a second data-acknowledgement frame from the at least one other client device within the predetermined amount of time after sending the aggregated frame. In some examples, the timer module 546 can set a DACK timeout time based on DACK length. For example, the DACK timeout time can be included as a duration period in an aggregated DACK frame header. The client devices can read the timeout time in the aggregated DACK frame header and set a NAV period accordingly.

It is to be understood that the block diagram of FIG. 5 is not intended to indicate that the computing system 500 is to include all of the components shown in FIG. 5. Rather, the computing system 500 can include fewer or additional components not illustrated in FIG. 5 (e.g., additional applications, additional modules, additional memory devices, additional network interfaces, additional MACs, etc.). Furthermore, any of the functionalities of the transceiver module 542, the DACK aggregator module 544, and the timer module 546, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 6:
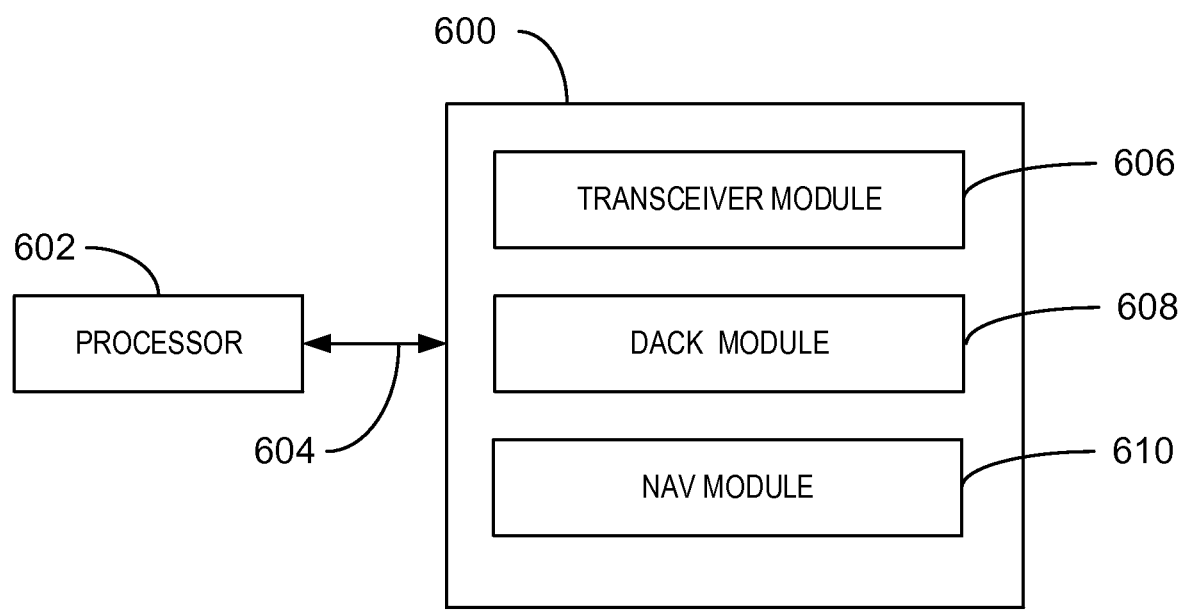
FIG. 6 is a block diagram showing an example tangible, computer-readable storage medium that can be used for wireless communication.

FIG. 6 is a block diagram showing an example tangible, computer-readable storage medium that can be used for wireless communication. The tangible, computer-readable storage media 600 can be accessed by a processor 602 over a computer bus 604. Furthermore, the tangible, computer-readable storage media 600 can include code to direct the processor 602 to perform the current methods. For example, the computer-readable storage media 600 can be in the client devices of FIG. 1 above.

The various software components discussed herein can be stored on the tangible, computer-readable storage media 600, as indicated in FIG. 6. For example, the tangible computer-readable storage media 600 can include a transceiver module 606, a DACK module 608, and a NAV module 610. The transceiver module 542, DACK aggregator module 544, and timer module 546, refer to structural elements that perform associated functions. In some embodiments, the functionalities of the transceiver module 542, DACK aggregator module 544, and timer module 546, can be implemented with logic, wherein the logic, as referred to herein, can include any suitable hardware (e.g., a processor, among others), software (e.g., an application, among others), firmware, or any combination of hardware, software, and firmware. In some implementations, the transceiver module 606 can include instructions to receive a first data frame from a host device. For example, the data frame can include any data for the client device. The DACK module 608 can also include code to generate and send a data-acknowledgement (DACK) frame to the host device in response to receiving the first data frame. For example, the DACK frame can include a data frame to be transmitted within an acknowledgment frame. In some examples, the DACK frame can be sent to the host device within a predetermined amount of time. For example, the predetermined amount of time can be a SIFS period. The transceiver module 606 can include code to receive an aggregated frame including a response data-acknowledgement frame from the host device. For example, the aggregated frame can include a DACK frame in response to a previously transmitted DACK frame. In some examples, the aggregated frame can also include a data frame to be sent to another client device. The transceiver module 606 can also further include code to receive a second aggregated frame including a second data frame from the host device. For example, the second aggregated frame can include one or more data frames to be sent to the client device in addition to a DACK frame for another client device. In some examples, the DACK module 608 can include code to send a second data-acknowledgment (DACK) frame to the host device in response to receiving the second aggregated frame. For example, the second DACK frame can be sent within a predetermined amount of time of receiving the second aggregated frame, such as a SIFS period.

In some examples, the NAV module 610 can detect a duration field in the first aggregated frame and set a NAV period accordingly. For example, the NAV module 610 can set a NAV period equal to the time in the duration field of the aggregated frame when the aggregated frame contains a DACK for the client.

It is to be understood that any number of additional software components not shown in FIG. 6 can be included within the tangible, computer-readable storage media 600, depending on the specific application. Although the disclosed subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for wireless communication. The example system includes a processor and a computer-readable memory storage device storing executable instructions that, based at least on an execution by the processor, cause the processor to send a data frame to a client device. The instructions also cause the processor to receive a data-acknowledgment frame from the client device in response to the data frame within a predetermined time. The instructions also cause the processor to aggregate a response data-acknowledgment frame with at least one data frame to form an aggregated frame. The instructions also cause the processor to send the aggregated frame to the client device and the at least one other client device within the predetermined time after receiving the data-acknowledgement frame. Alternatively, or in addition, the data-acknowledgment frame can include an address field including a media access control (MAC) address of an access point including the processor and a resolved field set to a value indicating enabled data-acknowledgment. Alternatively, or in addition, the response data-acknowledgment frame can include an address field including a MAC address of the client device and a resolved field set to a value indicating enabled data-acknowledgment. Alternatively, or in addition, the processor can further receive a second data-acknowledgement frame from the at least one other client device within the predetermined amount of time after sending the aggregated frame. Alternatively, or in addition, the processor can aggregate the response data-acknowledgment frame in response to detecting a signal strength that exceeds a threshold signal strength. Alternatively, or in addition, the predetermined time can be a Short Interframe Space (SIFS) time. Alternatively, or in addition, the processor can further set a DACK timeout time based at least on DACK length.

EXAMPLE 2

This example provides for an example system for wireless communication. The example system includes a processor and a computer-readable memory storage device storing executable instructions that, based at least on an execution by the processor, cause the processor to receive a first data frame from a host device. The instructions also cause the processor to generate a data-acknowledgment frame and send the data-acknowledgement frame to the host device in response to receiving the first data frame. The instructions also cause the processor to receive an aggregated frame including a response data-acknowledgement frame from the host device. The instructions also cause the processor to receive a second aggregated frame including a second data frame from the host device. The instructions also cause the processor to generate a second data-acknowledgment frame and send the second data-acknowledgment frame to the host device in response to receiving the second aggregated frame. Alternatively, or in addition, the data-acknowledgment frame can include an address field including a media access control (MAC) address of an access point including the processor and a resolved field set to a value indicating data-acknowledgment. Alternatively, or in addition, the response data-acknowledgment frame can include an address field including a MAC address of a client device and a resolved field set to a value indicating data-acknowledgment. Alternatively, or in addition, the processor is to further receive a beacon from the host device. Alternatively, or in addition, the beacon can include a field set to a value indicating data-acknowledgment is enabled. Alternatively, or in addition, the processor is to further receive a DACK timeout time. Alternatively, or in addition, the DACK timeout time can be based at least on a DACK frame length. Alternatively, or in addition, the predetermined time can be a Short Interframe Space (SIFS) time. Alternatively, or in addition, the host device can be an access point. Alternatively, or in addition, the host device can be a gaming console.

EXAMPLE 3

This example provides for an example method for wireless communication. The example method includes sending, via a host device, a data frame to a client device. The example method includes receiving, at the host device, a data-acknowledgment frame from the client device in response to the data frame within a predetermined time. The example method also includes aggregating, via the host device, a response data-acknowledgment frame with at least one data frame to be sent to at least one other client device. The example method also further includes sending, via the host device, the aggregated frame to the client device and the at least one other client device within the predetermined time after receiving the data-acknowledgement frame. Alternatively, or in addition, the example method may include receiving, at the host device, a second data-acknowledgement frame from the at least one other client device within the predetermined amount of time after sending the aggregated frame. Alternatively, or in addition, the example method may include sending the aggregate response data-acknowledgment frame in response to receiving the data-acknowledgment frame based on detecting a signal strength that exceeds a threshold signal strength. Alternatively, or in addition, the example method may include scheduling a plurality of data frames to be sent to the client device based on expiration times for the plurality of data frames. Alternatively, or in addition, the example method may include sending a wakeup time to the client device.

EXAMPLE 4

This example provides for an example one or more computer-readable memory storage devices for storing computer readable instructions that, when executed by one or more processing devices, instruct wireless communication. The computer-readable instructions may include code to receive a first data frame from a host device. The computer-readable instructions may include code to generate and send a data-acknowledgement (DACK) frame to the host device in response to receiving the first data frame. The computer-readable instructions may include code to receive an aggregated frame including a response data-acknowledgement frame from the host device. The computer-readable instructions may include code to receive a second aggregated frame including a second data frame from the host device. The computer-readable instructions may include code to send a second data-acknowledgment (DACK) frame to the host device in response to receiving the second aggregated frame. The computer-readable instructions may include code to detect a duration field in the first aggregated frame and set a NAV period accordingly. Alternatively, or in addition, the data frame can include any data for the client device. Alternatively, or in addition, the DACK frame can include a data frame to be transmitted within an acknowledgment frame. Alternatively, or in addition, the DACK frame can be sent to the host device within a predetermined amount of time. Alternatively, or in addition, the predetermined amount of time can be a SIFS period. Alternatively, or in addition, the aggregated frame can include a DACK frame in response to a previously transmitted DACK frame. Alternatively, or in addition, the second aggregated frame can include one or more data frames to be sent to the client device in addition to a DACK frame for another client device. Alternatively, or in addition, the second DACK frame can be sent within a predetermined amount of time of receiving the second aggregated frame. Alternatively, or in addition, the predetermined amount of time of receiving the second aggregated frame can be a SIFS period. Alternatively, or in addition, the computer-readable instructions can include code to set a NAV period equal to the time in the duration field of the aggregated frame when the aggregated frame contains a DACK for the client.

EXAMPLE 5

This example provides for an example system for wireless communication. The example system includes means for sending a data frame to a client device. The example system also includes means for receiving a data-acknowledgment frame from the client device in response to the data frame within a predetermined time. The example system also includes means for aggregating a response data-acknowledgment frame with at least one data frame to form an aggregated frame. The example system also includes means for sending the aggregated frame to the client device and the at least one other client device within the predetermined time after receiving the data-acknowledgement frame. Alternatively, or in addition, the data-acknowledgment frame can include an address field including a media access control (MAC) address of an access point including the processor and a resolved field set to a value indicating enabled data-acknowledgment. Alternatively, or in addition, the response data-acknowledgment frame can include an address field including a MAC address of the client device and a resolved field set to a value indicating enabled data-acknowledgment. Alternatively, or in addition, the example system can also include means for receiving a second data-acknowledgement frame from the at least one other client device within the predetermined amount of time after sending the aggregated frame. Alternatively, or in addition, the example system can also include means for aggregating the response data-acknowledgment frame in response to detecting a signal strength that exceeds a threshold signal strength. Alternatively, or in addition, the predetermined time can be a Short Interframe Space (SIFS) time. Alternatively, or in addition, the processor can further set a DACK timeout time based at least on DACK length.

EXAMPLE 6

This example provides for an example system for wireless communication. The example system includes means for receiving a first data frame from a host device. The example system also includes means for generating a data-acknowledgment frame and send the data-acknowledgement frame to the host device in response to receiving the first data frame. The example system also includes means for receiving an aggregated frame including a response data-acknowledgement frame from the host device. The example system also includes means for receiving a second aggregated frame including a second data frame from the host device. The example system also includes means for generating a second data-acknowledgment frame and send the second data-acknowledgment frame to the host device in response to receiving the second aggregated frame. Alternatively, or in addition, the data-acknowledgment frame can include an address field including a media access control (MAC) address of an access point including the processor and a resolved field set to a value indicating data-acknowledgment. Alternatively, or in addition, the response data-acknowledgment frame can include an address field including a MAC address of a client device and a resolved field set to a value indicating data-acknowledgment. Alternatively, or in addition, the example system can also include means for receiving a beacon from the host device. Alternatively, or in addition, the beacon can include a field set to a value indicating data-acknowledgment is enabled. Alternatively, or in addition, the example system can also include means for receiving a DACK timeout time. Alternatively, or in addition, the DACK timeout time can be based at least on a DACK frame length. Alternatively, or in addition, the predetermined time can be a Short Interframe Space (SIPS) time. Alternatively, or in addition, the host device can be an access point. Alternatively, or in addition, the host device can be a gaming console.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for reducing contention in wireless communication within a network, comprising:
a processor; and a computer-readable memory storage device storing executable instructions that, based at least on an execution by the processor, cause the processor to:
send a data frame to a first client device in the network in response to a successful contention of a medium;
receive a data-acknowledgment (DACK) frame from the first client device in response to the data frame;
transmit a series of (DACK) frames to the first client device and a second client device in response to the successful contention, wherein transmitting the series of DACK frames comprises:
for each DACK frame of the series of DACK frames:
receiving a reply DACK frame, from at least one of the client devices, within a preceding predetermined amount of time,
wherein the at least one of the client devices does not perform contention for the medium for sending the reply DACK frame based on the sending occurring within the preceding predetermined amount of time; and
in response to receiving the reply DACK frame, transmitting, to at least one of the client devices, the DACK frame of the series of DACK frames within a successive predetermined amount of time,
wherein contention for the medium is not performed for transmitting the DACK frame of the series of DACK frames based on the transmitting of the DACK frame of the series of DACK frames occurring within the successive predetermined amount of time,
wherein a limit to a number of the series of DACK frames transmitted in response to the successful contention is preset based on a total number of clients within the network.

2. The system of claim 1,
wherein the received data-acknowledgment frame from the first client device comprises an address field comprising
a media access control (MAC) address of an access point comprising the processor and
a resolved field set to a value indicating enabled data-acknowledgment.

3. The system of claim 1,
wherein at least one of the series of DACK frames comprises an address field comprising
a MAC address of the first client device and
a resolved field set to a value indicating enabled data-acknowledgment.

4. The system of claim 3,
wherein the processor is to aggregate at least one of the series of DACK frames in response to detecting a signal strength that exceeds a threshold signal strength.

5. The system of claim 1,
wherein the successive predetermined time and the preceding predetermined amount of time each comprises a Short Interframe Space (SIFS) time.

6. The system of claim 1,
wherein the processor is to further set a data-acknowledgment (DACK) timeout time based at least on a DACK frame length.

7. The system of claim 1,
wherein the preset limit to the number of the series of DACK frames is also based on an amount of data latency to be tolerated and a priority of packet traffic.

8. The system of claim 1,
wherein the second client device is to
detect a duration period in the DACK frame from the first client device and
set a network allocation vector based on the duration period.

9. The system of claim 1, wherein each DACK frame in the series of DACK frames includes a data frame queued to be sent to a particular client device of the clients within the network.

10. The system of claim 1, wherein each DACK frame in the series of DACK frames includes data corresponding to a file for particular client device of the clients within the network or corresponds to an application executing on the particular client device.

11. The system of claim 1, wherein the processor is to
construct the series of DACK frames by selecting data
frames to be sent to the first client device or the second
client device and
convert each selected data frame to a DACK frame of the
series of DACK frames,
wherein the data frames are selected based on respective
expiration times associated with the data frames or
based on a position of the data frames in a queue.

12. A system for reducing contention wireless communication within a network, comprising:
a processor; and a computer-readable memory storage device storing executable instructions that, based at least on an execution by the processor, cause the processor to:
receive a first data frame, from a host device in the network, in response to a successful contention of a medium;
generate a data-acknowledgment (DACK) frame and send the DACK frame to the host device in response to receiving the first data frame;
receive a series of DACK frames, from the host device, in response to the successful contention, wherein receiving the series of DACK frames comprises:
for each DACK frame of the series of DACK frames:
sending a reply DACK frame, to the host device, within a preceding predetermined amount of time,
wherein contention for the medium is not performed for sending the reply DACK frame based on the sending of the reply DACK frame occurring within the preceding predetermined amount of time; and
receiving, from the host device, the DACK frame of the series of DACK frames, wherein the host device transmits the DACK frame of the series of DACK frames within a successive predetermined amount of time,
wherein the host device does not perform contention for the medium for transmitting the DACK frame of the series of DACK frames based on the transmitting of the DACK frame of the series of DACK frames occurring within the successive predetermined amount of time,
wherein a limit to a number of the series of DACK frames received in response to the successful contention is preset based on an amount of data latency to be tolerated and a total number of clients within the network.

13. The system of claim 12,
wherein the generated DACK frame comprises an address field comprising
a media access control (MAC) address of an access point comprising the processor and
a resolved field set to a value indicating data-acknowledgment.

14. The system of claim 12,
wherein at least one DACK frame of the series of DACK frames comprises an address field comprising
a MAC address of a client device of a plurality of client devices and
a resolved field set to a value indicating data-acknowledgment.

15. The system of claim 12,
wherein the processor is to further receive a beacon from the host device,
wherein the beacon comprises a field set to a value indicating data-acknowledgment is enabled.

16. The system of claim 15,
wherein the processor is to further receive a data-acknowledgment (DACK) timeout time,
wherein the DACK timeout time is based at least on a DACK frame length.

17. The system of claim 12,
wherein the successive predetermined time and the preceding predetermined amount of time each comprises a Short Interframe Space (SIFS) time.

18. A method for reducing contention in wireless communication within a network, comprising:
sending, via a host device, a data frame to a first client device in the network in response to a successful contention of a medium;
receiving, at the host device, a data-acknowledgment (DACK) frame from the first client device in response to the data frame;
transmitting a series of DACK frames to the first client device and a second client device in response to the successful contention, wherein transmitting the series of DACK frames comprises:
for each DACK frame of the series of DACK frames:
receiving a reply DACK frame, from at least one of the client devices, within a preceding predetermined amount of time,
wherein the at least one of the client devices does not perform contention for the medium for sending the reply DACK frame based on the sending occurring within the preceding predetermined amount of time; and
in response to receiving the reply DACK frame, transmitting, to at least one of the client devices, the DACK frame of the series of DACK frames within a successive predetermined amount of time,
wherein contention for the medium is not performed for transmitting the DACK frame of the series of DACK frames based on the transmitting of the DACK frame of the series of DACK frames occurring within the successive predetermined amount of time,
wherein a limit to a number of the series of DACK frames transmitted in response to the successful contention is preset based on a total number of clients within the network.

19. The method of claim 18,
wherein the preset limit is also based on a priority of packet traffic.

20. The method of claim 18, further comprising
wherein transmitting the series of DACK frames is based on detecting a signal strength that exceeds a threshold signal strength.

21. The method of claim 18, further comprising
scheduling a plurality of data frames to be sent to the first client device based on expiration times for the plurality of data frames.

22. The method of claim 18, further comprising
sending a wakeup time to the first client device.

* * * * *